United States Patent
Charles

(10) Patent No.: US 7,444,211 B2
(45) Date of Patent: Oct. 28, 2008

(54) METHOD OF VALIDATING A FLIGHT PLAN CONSTRAINT

(75) Inventor: Loïc Charles, Toulouse (FR)

(73) Assignee: Thales (FR)

( * ) Notice: Subject to any disclaimer, the term of this patent is extended or adjusted under 35 U.S.C. 154(b) by 479 days.

(21) Appl. No.: 10/537,345

(22) PCT Filed: Dec. 2, 2003

(86) PCT No.: PCT/EP03/50920

§ 371 (c)(1),
(2), (4) Date: Jun. 3, 2005

(87) PCT Pub. No.: WO2004/053611

PCT Pub. Date: Jun. 24, 2004

(65) Prior Publication Data

US 2006/0025898 A1    Feb. 2, 2006

(30) Foreign Application Priority Data

Dec. 6, 2002    (FR) .................................. 02 15481

(51) Int. Cl.
*G01C 23/00* (2006.01)
(52) U.S. Cl. ............................................. 701/3; 701/9
(58) Field of Classification Search ..................... 701/1, 701/3, 9, 14; 340/945, 963, 973
See application file for complete search history.

(56) References Cited

U.S. PATENT DOCUMENTS

| 4,811,230 A | 3/1989 | Graham et al. |
| 5,797,106 A | 8/1998 | Murray et al. |
| 2007/0156297 A1* | 7/2007 | Tzidon .......................... 701/14 |

* cited by examiner

*Primary Examiner*—Yonel Beaulieu
(74) *Attorney, Agent, or Firm*—Lowe Hauptman Ham & Berner, LLP

(57) ABSTRACT

An FMS flight management computer equipping an aerodyne, complies with a constraint, in particular an altitude constraint, of the flight plan (Dpv) at an imposed waypoint close to the position of the aerodyne at the moment of instigation of its automatic flight plan following function. It consists in validating, in advance, such a constraint by projecting itself into a near future by way of a forecast (Pt) of the displacement of the aerodyne taking account of the motion of the aerodyne during the transition between the instances of application of the flight presets prevailing before the instigation of the automatic following function and those newly provided by the FMS flight computer (30) during this instigation.

7 Claims, 2 Drawing Sheets

METHOD OF VALIDATING A FLIGHT PLAN CONSTRAINT

CROSS-REFERENCE TO RELATED APPLICATIONS

The present Application is based on International Application No. PCT/EP2003/050920, filed on Dec. 2, 2003, which in turn corresponds to FR 02/15481 filed on Dec. 6, 2002, and priority is hereby claimed under 35 USC §119 based on these applications. Each of these applications are hereby incorporated by reference in their entirety into the present application.

FIELD OF THE INVENTION

The present invention relates to the automatic following of a flight plan by a flight management computer equipping an aerodyne and more particularly to the compliance, by this flight management computer, with a constraint at an imposed waypoint close to the position of the aerodyne at the moment of the instigation of the automatic following of the flight plan.

DESCRIPTION OF THE RELATED ART

Present-day aerodynes exhibit three levels of piloting equipment:
- a first level of equipment consisting of the flight controls acting directly on the control surfaces and engines,
- a second level of equipment consisting of the automatic pilot and/or of the flight director acting on the flight controls, directly for the automatic pilot or by way of the pilot for the flight director, so as to steer the aerodyne with regard to a flight parameter such as for example, heading, roll, pitch, altitude, speed, etc. and
- a third level of equipment consisting of the flight management computer known by the initials FMS standing for "Flight Management System" capable of formulating a flight plan and of acting on the automatic pilot or the flight director so as to make the aerodyne follow it.

The flight management computer FMS, referred to hereinbelow as the flight computer FMS, has, among other main functions: the formulation and the automatic following of a flight plan, a flight plan consisting of the lateral and vertical trajectories that the aerodyne has to adopt so as to go from the position that it occupies to its destination, as well as speeds of traversal of these trajectories.

The formulation of a flight plan is done, among other things, on the basis of imposed waypoints associated with altitude and speed constraints. These imposed waypoints and their associated constraints are introduced, into the FMS flight computer, by the crew of the aerodyne, by means of equipment of the flight deck with keyboard and screen affording the man/machine interface such as that known by the title MCDU standing for "Multipurpose Control and Display Unit". The actual formulation consists in constructing the lateral and vertical trajectories of the flight plan on the basis of a stringing together of straight line segments starting from a departure point, passing through the imposed waypoints and arriving at a finish point, while complying with the standard rules of construction and while taking account of altitude and speed constraints associated with each imposed waypoint.

The automatic following of a flight plan consists in detecting, in the course of a mission, the deviations of the aerodyne with respect to the preestablished flight plan and in giving the automatic pilot or the flight director the flight presets making it possible to correct these deviations, so as to keep them within narrow limits. To evaluate the deviations with respect to the flight plan, the FMS flight computer uses the position of the aerodyne as measured periodically by the onboard sensors, more precisely, its projections onto the lateral and vertical trajectories of the flight plan and forecasts of vertical and horizontal trajectories made by ignoring the transition phases, the ignoring of the transition phases being justified by the fact that the characteristic response time of an FMS flight computer is markedly less than the airplane transient. Once in possession of these deviations, the FMS flight computer avails itself of two laws of acquisition and of holding of the horizontal and vertical trajectories, installed within it and commonly referred to as the "Hpath" and "Vpath" laws, these standing respectively for "Horizontal Path" and "Vertical Path", so as to produce, on the basis of the evaluated deviations, altitude and speed presets transmitted to the automatic pilot or to the flight director so as to comply with the flight plan constraints input by the crew of the aerodyne.

Upon the instigation of an automatic flight plan following function, an FMS flight computer takes command of the automatic pilot and of the flight director by giving them new flight presets in accordance with the flight plan. This instant of instigation of the automatic flight plan following function of an FMS flight computer may occur while the aerodyne is very close to an imposed waypoint compelling the FMS flight computer to immediately validate the constraints at this imposed waypoint while the aerodyne is on a transition trajectory which corresponds to the passage, from the flight presets prevailing before the instigation of the automatic flight plan following function, to the new flight presets given by the FMS flight computer commencing the automatic following of the flight plan, and which is not taken into account by the FMS flight computer.

This operating mode is satisfactory in the very great majority of situations of resumption of an automatic flight plan following function by an FMS flight computer after a piloted phase of flight since the pilot generally watches to see that the aerodyne has returned to a situation very close to that held in its flight plan before handing over to the FMS computer. However, it may happen, in certain situations, that this operating mode leads the FMS flight computer to wrongly neglect a constraint imposed at the next imposed waypoint.

One of these situations is that of an approach to an airport with a view to a landing, when the FMS flight computer takes over again, after having been momentarily disconnected by the pilot so as to execute, for a direct action on the automatic pilot or the flight director placed for example in selected mode for maintaining an emergency descent speed preset, a maneuver for passing to a lower altitude level not envisaged in the flight plan but requested by the air traffic control authority, while the aircraft is in proximity to an imposed waypoint where it must comply with an imposed minimum altitude. In this case, the more the actual speed of descent of the aerodyne at the moment of the instigation of the FMS flight computer deviates from the descent speed preset in the flight plan, the more the forecast of vertical trajectory made by the FMS flight computer to validate the altitude constraint diverges, in the short term, from reality. The error made may possibly, beyond a certain threshold, lead the FMS flight computer to consider the minimum altitude constraint naturally complied with whereas it is nothing of the sort. The altitude constraint may be of the "AT" type or else of the "AT or ABOVE" type. Thus an altitude constraint of the "AT" (respectively "AT or ABOVE") type at an imposed waypoint is understood to mean that the altitude of the aerodyne must be identical (respectively greater than or equal) to within a standardized tolerance, to the value of the altitude constraint at the imposed waypoint. In the case of too fast a descent, the aerodyne not being permitted to reclimb, the latter is thus compelled to comply with a plateau until the imposed waypoint has been passed so as to satisfy the altitude constraint associated with this point. This is manifested by the sending of an altitude preset identical to the value of the constraint to the automatic pilot or to the flight director, until the associated imposed waypoint has been passed.

SUMMARY OF THE INVENTION

The present invention is aimed at improving compliance with a constraint at a near imposed waypoint, by an FMS flight computer resuming automatic flight plan following after a phase of piloted flight.

Its subject is a method of validating a flight plan constraint, at an imposed waypoint or constraint point, for an FMS flight computer delivering flight presets to an aerodyne during a resumption of automatic following of a flight plan after a piloted flight phase, consisting, for the validation of said constraint, in making a short term forecast of the displacement of the aerodyne up to an imposed waypoint, taking account of the transition between the instances of application by the aerodyne of the flight presets prevailing before the resumption of the automatic following of the flight plan and those newly provided by the FMS flight computer during this same resumption, and in validating said constraint in the case where it would not be complied with by the aerodyne if it reached the imposed waypoint by following said forecast of displacement, doing so in order that it remain taken into account in the subsequent automatic following of the flight plan.

Advantageously, the forecast of displacement of the aerodyne up to the imposed waypoint, taking account of the transition between the instances of application by the aerodyne of the flight presets prevailing before the resumption of the automatic following of the flight plan and those newly provided by the FMS flight computer during the same resumption is made according to a first order variation model.

Advantageously, when the flight plan constraint is an altitude constraint, the forecast of displacement of the aerodyne up to the imposed waypoint taking account of the transition between the instances of application by the aerodyne of the flight presets prevailing before the resumption of the automatic following of the flight plan and those newly provided by the FMS flight computer during the same resumption is limited to a vertical trajectory forecast.

Advantageously, the vertical trajectory forecast is made by assuming that the aerodyne has, during the vertical speed transition between its initial value $Vz_0$ before the automatic following of the flight plan by the FMS flight computer and its final value $Vz_f$ corresponding to the flight plan and imposed by the FMS computer, a constant ground speed "GrdSpd" and a vertical speed Vz according to a first order variation model complying with the relation:

$$Vz = (Vz_0 - Vz_f) e^{(-t/\tau)} + Vz_f \quad (1)$$

t being the time variable and τ a time constant characteristic of the aerodyne steered by its automatic pilot or its flight director, according to a law of acquisition of a vertical speed preset $Vz_f$.

Advantageously, said validation of an altitude constraint consists in:

estimating the date $t_{seq}$ of passage of the aerodyne at the constrained waypoint on the basis of the distance $\Delta dist_0$ between the position of the aerodyne upon the instigation of the automatic following of the flight plan and the position of the constrained waypoint by assuming that the aerodyne has a constant ground speed GrdSpd and by applying the relation:

$$t_{seq} = \frac{\Delta dist_0}{GrdSpd} \quad (2)$$

estimating the difference in altitude $\Delta Z_{seq}$ between the predicted altitude of the aerodyne at the constrained waypoint and the value of the altitude constraint, by assuming that the vertical speed of the aerodyne changes, from its initial value $Vz_0$ before the automatic following of the flight plan by the FMS flight computer to its final value $Vz_f$ corresponding to the flight plan and imposed by the FMS flight computer, by following a first order variation model complying with the relation:

$$\Delta z_{seq} = -\tau(Vz_0 - Vz_f)\left(1 - e^{\left(\frac{-t_{seq}}{\tau}\right)}\right) + Vz_f \cdot t_{seq} \quad (3)$$

τ being the time constant defined with relation (1), and validating the taking into account of the altitude constraint in the case of compliance with the inequality:

$$|\Delta z_{seq}| > |\Delta z_0| - \Delta z_{marg}$$

$\Delta z_{marg}$ being a safety altitude margin.

Advantageously, the initial value $V_{z0}$ of the speed of descent of the aerodyne at the moment of the resumption of the automatic following of the flight plan by the FMS flight computer, taken into consideration by the validation system, is given, at the moment of the instigation of the automatic following of the flight plan, by vertical speed sensors equipping the aerodyne.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the invention will emerge from the description hereinbelow of an embodiment of the invention given by way of example. This description will be offered in conjunction with the drawing in which:

a FIG. 1 shows the customary organization, in various layers, of the equipment for piloting an aerodyne and the location, within this equipment, of a validation system according to the invention, a FIG. 2 illustrates a case of resumption of automatic flight plan following not involving, on the part of an FMS flight computer, any noncompliance with an altitude constraint at a near compulsory imposed waypoint, and a FIG. 3 illustrates a case of resumption of automatic flight plan following entailing the action of a validation system according to the invention on the FMS flight computer so as to compel it to comply with an altitude constraint at a near imposed waypoint.

DETAILED DESCRIPTION OF THE INVENTION

Figure 1:
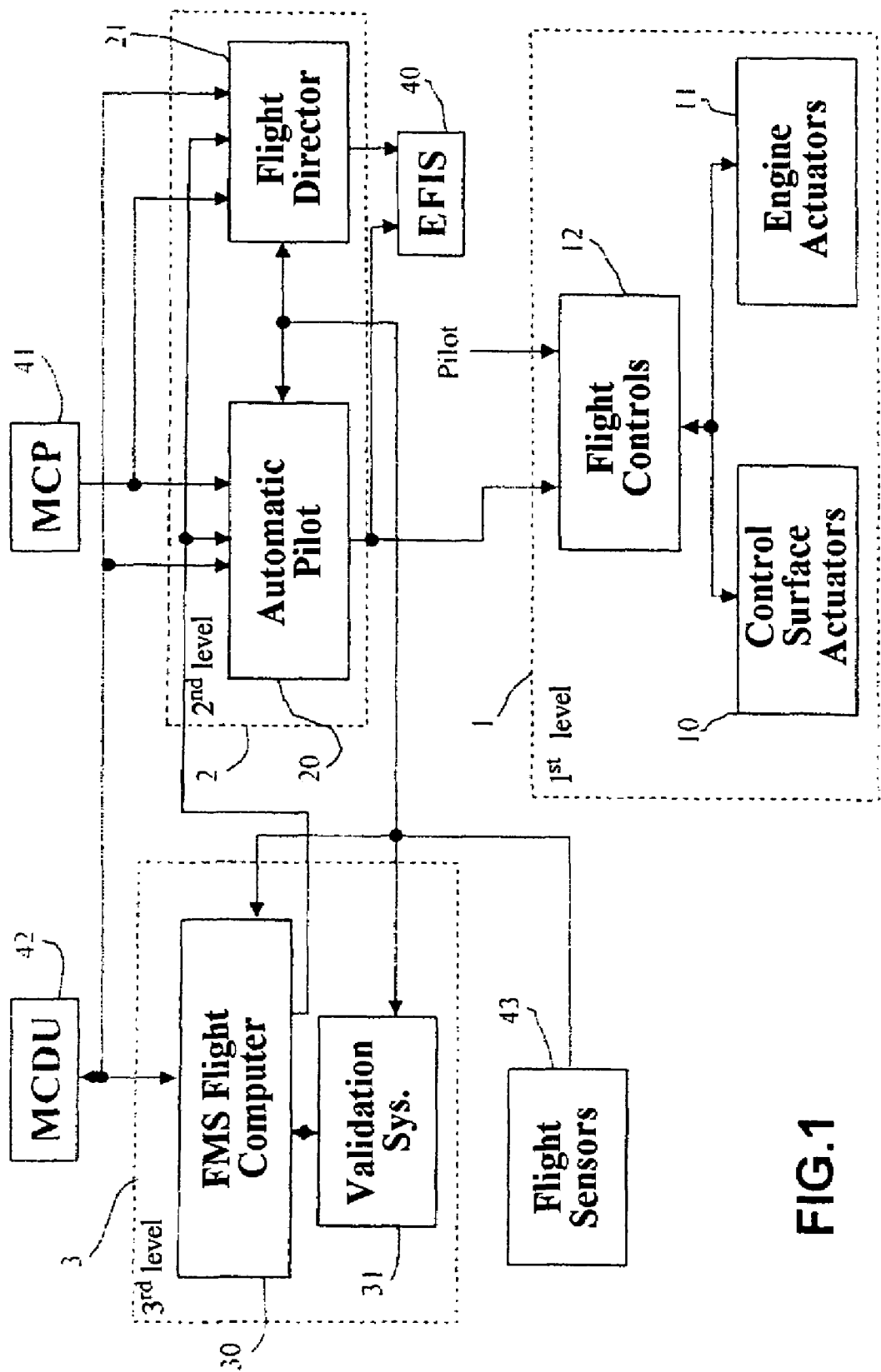

An aerodyne is piloted by way of orientable surfaces: control surfaces and of the output of the or of its engines. To this end, it comprises, as represented in FIG. 1, actuators 10, 11 of its control surfaces and of its engines receiving position presets formulated by equipment 12 referred to as "flight controls" so as to maintain the aircraft in an attitude prescribed by the pilot or by a piece of automatic piloting equipment. The flight control equipment 12 has a short characteristic response time, of the order of a second, and constitutes, together with the actuators 10, 11, a first level 1 of piloting equipment.

This first level 1 piloting equipment is on its own sufficient to pilot the aerodyne. However, it is very often supplemented with a second level 2 of equipment consisting of an automatic pilot 20 and of a flight director 21 which greatly facilitate the task of the pilot by automating the following of presets for heading, altitude, speed or vertical speed amongst others, the one, the automatic pilot 20, by direct action on the flight controls 12 and the other, the flight director 21, by indicating to the pilot, by way of display screens EFIS 40 (the initials EFIS standing for "Electronic Flight Instrument System"), the orders to be given to the flight controls 12.

However with the aim of facilitating the task of the pilot, the automatic pilot 20 and the flight director 21 are often supplemented with an FMS flight computer 30 automating the tasks of formulation and of following of the flight plan by the aerodyne. The FMS flight computer 30 can be parameterized by the pilot by means of a man/machine interface MCDU 42. It constitutes a third level 3 of piloting equipment since it intervenes on the piloting of the aerodyne solely by way of the automatic pilot 20 or of the flight director 21 constituting the second level 2 of piloting equipment. For this reason, it must have, in its function following a preestablished flight plan, an even longer characteristic response time than the automatic pilot and the flight director, for example of the order of a minute.

The automatic pilot 20 and the flight director 21 often constitute one and the same piece of equipment since they fulfill the same tasks, the only difference being the presence or otherwise of the pilot in the chain for transmitting the orders to the flight control equipment 12. Said equipment is accessible to the pilot via two man/machine interfaces, the one 41 termed "MCP" (the initials MCP standing for: Module Control Panel, and the other 42 termed "MCDU". The MCP interface 41 directly selects and parameterizes the modes of operation of the automatic pilot and of the flight director: following of heading, of altitude, of speed and of vertical speed etc. . . . The MCDU interface 42 acts on the automatic pilot 20 and/or the flight director 21 via the FMS flight computer 30 which establishes, selects and parameterizes modes of operation and presets so as to steer the aerodyne over a 4D trajectory. The automatic pilot 20 and the flight director 21 always intervening by way of the flight control equipment 12, must have a longer characteristic response time than the flight control equipment 12, for example of the order of some 10 seconds.

Flight sensors 43 such as a barometric altimeter or a radio-altimeter, an inertial platform or a satellite based positioning receiver, air speed probes, etc. provide the aerodyne with particulars regarding its position, its attitude, its speed vector, its altitude, etc. which are utilized more or less precisely by the automatic pilot 20, the flight director 21 and the FMS flight computer 30.

As indicated previously, a flight plan consists of the lateral and vertical trajectories that the aerodyne has to follow so as to reach the position that it occupies at its destination point, as well as of presets of speed of traversal along these trajectories.

The formulation of a flight plan by an FMS flight computer 30 is based on a succession of imposed waypoints with constraints that may pertain to the altitude, the speed, the time, the approach heading and distant heading, some of these being associated with the imposed waypoints and others with the joining trajectories between two imposed waypoints. These imposed waypoints and the associated constraints are introduced into the FMS flight computer 30, in the guise of parameters, for example by means of the MCDU interface 42.

The automatic following, by an FMS flight computer 30, of a flight plan formulated beforehand, consists in delivering to the automatic pilot or to the flight director the presets of heading, of roll (Hpath law), of pitch (Vpath law), of altitude, of speed allowing the aerodyne to follow the preestablished flight plan while correcting, if necessary, any detected deviation and watching to see that the constraints of the flight plan are complied with.

Upon instigation of its function of automatic following of a preestablished flight plan, the FMS flight computer 30 takes command of the automatic pilot 20 and of the flight director 21 by giving them new flight presets in accordance with the flight plan whilst ignoring the aerodyne's trajectory of transition due to the passage, from the flight presets prevailing before the instigation of the automatic flight plan following function, to the new flight presets given by the FMS flight computer 30.

This operating mode spurning a more or less significant part of the transition trajectory traversed by the aerodyne upon the instigation of automatic following of a flight plan, has the drawback of allowing the possibility of an error of validation of a constraint of the flight plan at an imposed waypoint near the position of the aerodyne at the moment of this instigation. This may lead the FMS flight computer 30 neglect such a constraint.

As indicated previously, a situation in which an FMS flight computer may make an error of validation of a constraint of the flight plan at the moment of the instigation of its automatic flight plan following function is that of an approach to an airport with a view to a landing, when this instigation of the automatic flight plan following function intervenes after a piloted phase of flight in the course of which the pilot has taken command of the aircraft so as to execute a maneuver not scheduled in the flight plan but requested by the air traffic control authority, such as an emergency descent to a lower level, and the aerodyne is in proximity to an imposed waypoint where it must comply with an imposed minimum altitude.

In this case, the FMS flight computer 30 validates the altitude constraint on the basis of a forecast of the altitude taken by the aircraft at the imposed waypoint made on the basis of a short term forecast of vertical displacement of the aerodyne based on flight presets corresponding to following with no deviation from the flight plan. This short term forecast of vertical displacement is distorted at the start, by the fact that it does not take account of the vertical displacement of the aerodyne during the transition period necessary for the passage, from the execution of the flight presets prevailing before the instigation of the automatic following of the flight plan, to the execution of the new flight presets from the beginning of the automatic following of the flight plan. If the next imposed waypoint is sufficiently near, the error made in the short term forecast of vertical displacement of the aerodyne may distort the estimate of the altitude of the aerodyne at the imposed waypoint to the point of causing the FMS flight computer to mistakenly consider the altitude constraint as naturally complied with and to neglect it whereas it must take it into account subsequently after estimating the deviations of the aerodyne with respect to the flight plan.

Figure 2:
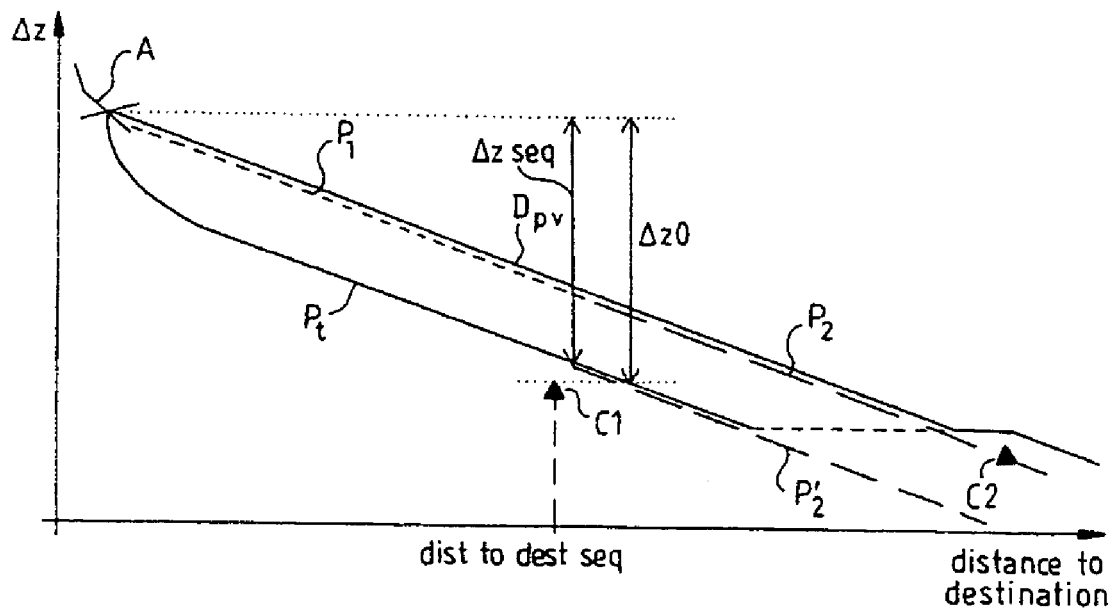
Figure 3:
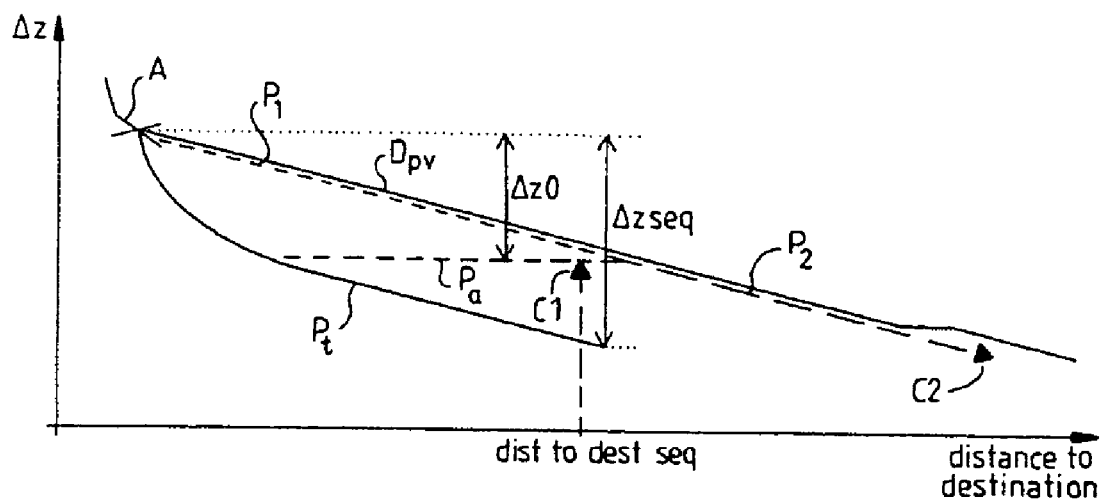

FIGS. 2 and 3 illustrate the two cases that may possibly be encountered in this situation, FIG. 2 showing the case where the next imposed waypoint is sufficiently distant for the transition displacement necessary for the aerodyne to apply the new flight presets originating the FMS flight computer not to distort the forecast of trajectory to the point of disrupting the operation of validation of the first altitude constraint encountered and FIG. 3 the reverse case.

FIGS. 2 and 3 are diagrams of vertical trajectories in two dimensions: distance to destination along the abscissa and altitude along the ordinate. These diagrams show the vertical descent trajectory $D_{pv}$, scheduled in the flight plan, that the aerodyne A ought to follow from the moment of the instigation of its flight computer's automatic flight plan following function. This vertical descent trajectory $D_{pv}$ complies with two altitude constraints C1, C2 at two successive imposed waypoints.

When the aerodyne A commences this vertical descent trajectory $D_{pv}$ when it has for a certain time been under the command of the automatic flight plan following function of its FMS flight computer 30, it enters it with no appreciable deviation, following the flight presets formulated by its FMS flight computer 30, which makes forecasts that are dependable since they are made on the basis of flight presets that it has given and that are currently being executed by the automatic pilot 20 or the flight director 21. The short term forecasts of vertical displacement made by the FMS flight computer 30 being dependable, the forecasts of the altitudes of the aerodyne at the imposed waypoints are likewise dependable and the validations of the constraints as and when they turn up are achieved with no problem.

The FMS flight computer 30 proceeds to a forecast of the altitude that the aerodyne will take at the waypoint constrained by C1 with the flight presets currently being executed. This altitude forecast is based on a forecast P1 of the vertical displacement of the aerodyne, represented dashed, which is reliable since it reproduces the descent slope scheduled in the flight plan and actually followed by the aerodyne. It shows that the aerodyne will have, with the flight presets currently being applied, an altitude at the first imposed waypoint greater than the first altitude constraint C1. The FMS flight computer 30 then considers the first minimum altitude constraint C1 as naturally complied with and neglects it in its subsequent following of the flight plan. This is manifested by the fact that the FMS flight computer 30 maintains the descent trajectory without modification.

When the FMS computer 30 has sequenced the point constrained by the first altitude constraint C1, it seeks to validate the second altitude constraint C2 and proceeds to a forecast of the altitude that the aerodyne will take at this second imposed waypoint with the flight presets currently being executed. This altitude forecast is based on a forecast P2, shown dashed, of the vertical displacement of the aircraft, which is again reliable since it reproduces the descent slope scheduled in the flight plan and actually followed by the aerodyne. It shows that the aerodyne will have, with the flight presets currently being applied, at the second imposed waypoint, an altitude less than the second minimum altitude constraint C2. The FMS flight computer 30 then considers that the second altitude constraint C2 will not naturally be complied with and takes account thereof in its subsequent following of the flight plan. This is manifested by the fact that the FMS flight computer imposes, on the aerodyne, when it arrives at the minimum altitude of the second constraint C2, a horizontal plateau until it has negotiated the second imposed waypoint and can resume the descent slope scheduled in the flight plan.

When the automatic trajectory following function of the FMS flight computer 30 is instigated at the moment at which the first altitude constraint C1 must be validated, the aerodyne is subjected to a transient displacement caused by the passage of its automatic pilot 20 or of its pilot director 21, from the execution of the flight presets prevailing before the instigation of the automatic flight plan following function, to the execution of the new flight presets formulated by this automatic following function, which transient displacement is disregarded in the aircraft's displacement forecast P1 which is made by the FMS flight computer 30 for the validation of this first altitude constraint C1 and which is based solely on flight presets adapted to an aerodyne following the flight plan. The disregarding of this transient displacement in the short term forecast P1 of the displacement of the aerodyne entails an error in the altitude forecast, at the first imposed waypoint, which increases with the deviation between the flight presets applied before and after the instigation of the automatic trajectory following and with the proximity of the first imposed waypoint, and which will go as far as to possibly entail an error of validation of the first altitude constraint C1, that is to say the disregarding of this altitude constraint while flight presets adapted to the sole following of the vertical trajectory of the flight plan do not make it possible to comply with it.

To avoid this, it is proposed that the flight computer (30 FIG. 1) be supplemented with a particular system (31 FIG. 1) for constraint validation of the flight plan replacing, upon the instigation of an automatic following of a flight plan, the customary displacement forecast P1 on which the FMS flight computer 30 bases itself for an operation of constraint validation, by a forecast of displacement Pt of the aerodyne taking account of the transient displacement induced by the changes of flight presets.

In the case of the validation of an altitude constraint, the displacement forecast is limited to the vertical plane. It is made by assuming that the aerodyne has, during the vertical speed transition between its initial value $Vz_0$ before the automatic following of the flight plan by the FMS computer and its final value $Vz_f$ corresponding to the flight plan and imposed by the FMS flight computer 30, a constant ground speed "GrdSpd" and a vertical speed Vz according to a first order variation model complying with the relation:

$$Vz = (Vz_0 - Vz_f) e^{-t/\tau} + Vz_f \qquad (1)$$

t being the time variable and $\tau$ a constant characteristic of the aerodyne steered by its automatic pilot or its flight director, according to a law of acquisition of a vertical speed preset $Vz_f$.

More precisely, the validation of a minimum altitude constraint at an imposed waypoint consists in:

estimating the date $t_{seq}$ of passage of the aerodyne at the constrained waypoint on the basis of the distance $\Delta dist_0$ between the position of the aerodyne upon the instigation of the automatic following of the flight plan and the position of the constrained waypoint by assuming that the aerodyne has a constant ground speed GrdSpd and by applying the relation:

$$t_{seq} = \frac{\Delta dist_0}{GrdSpd} \qquad (2)$$

estimating the difference in altitude $\Delta z_{seq}$ between the predicted altitude of the aerodyne at the constrained waypoint and the value of the altitude constraint, by assuming that the vertical speed of the aerodyne changes, from its initial value $Vz_0$ before the automatic following of the flight plan by the FMS flight computer to its final value $VZ_f$ corresponding to the flight plan and imposed by the FMS computer, by following a first order variation model complying with the relation which results, by integration of relation (1), in:

$$\Delta z_{seq} = -\tau(Vz_0 - Vz_f)\left(1 - e^{\left(\frac{-t_{seq}}{\tau}\right)}\right) + Vz_f \cdot t_{seq} \quad (3)$$

$\tau$ being the time constant defined with relation (1), and validating the taking into account of the altitude constraint in the case of compliance with the inequality:

$$|\Delta z_{seq}| > |\Delta z_0| - \Delta z_{marg}$$

$\Delta z_{marg}$ being a safety altitude margin.

The initial value $V_{z0}$ of the descent speed of the aerodyne at the moment of the resumption of the automatic following of the flight plan by the FMS flight computer, taken into consideration by the validation system, may be measured by vertical speed sensors equipping the aerodyne.

FIGS. 2 and 3 illustrate the new displacement forecast Pt obtained in the case of an aerodyne traveling, upon the instigation of the automatic flight plan following function, with a descent speed of 3000 feet/minute instead of the descent speed of 1000 feet/minute adopted for the vertical trajectory Dpv of the flight plan.

In the case of FIG. 2, the instigation of the automatic flight plan following function is done sufficiently upstream of the first imposed waypoint for the estimated altitude of the aerodyne at this first compulsory waypoint, based on a short term forecast Pt of displacement of the aerodyne taking account of its transition displacement, to satisfy the altitude constraint C1. The validation of the constraint C1 and its discounting which the FMS flight computer 30 does on the basis of the displacement forecast P1 disregarding the transient displacement made necessary by the changes of flight presets was therefore well-founded. The transient displacement of the aerodyne upon the instigation of the automatic flight plan following function causes the aerodyne not to follow, with the flight presets delivered by the FMS flight computer, the vertical trajectory Dpv scheduled in the flight plan but a vertical trajectory close to the forecast Pt. As a result, during the validation of the second altitude constraint C2, the FMS flight computer estimates the altitude of the aerodyne at the second imposed waypoint with the aid of the displacement forecast P'2 and not P2 and the aerodyne commences earlier the horizontal plateau at the minimum altitude imposed by the second constraint C2.

In the case of FIG. 3, the instigation of the automatic flight plan following function is done too late upstream of the first imposed waypoint for the estimated altitude of the aerodyne at the next compulsory waypoint to satisfy the altitude constraint C1. The validation of the constraint C1 and its discounting that the FMS flight computer 30 does on the basis of a displacement forecast P1 disregarding the transient displacement made necessary by the changes of flight presets was therefore not well-founded and would have led to non-compliance with the altitude constraint C1. By virtue of the proposed method of constraint validation, this error is avoided, the constraint C1 is still considered by the FMS flight computer 30 which causes the aerodyne to go to a horizontal plateau Pa as soon as it reaches the minimum altitude corresponding to the constraint C1, doing so until it has negotiated the first imposed waypoint where it resumes the trajectory of the flight plan.

The validation system which has been proposed can be effected through a new software task entrusted to the computer already used to fulfill the tasks of the FMS flight computer.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of validating a flight plan constraint, at an imposed waypoint, for a flight computer, comprising the steps of:
   delivering flight presets to an aerodyne during a resumption of automatic following of a flight plan after a piloted flight phase,
   making a forecast of the displacement of the aerodyne up to the imposed waypoint for a validation of said constraint by an FMS flight computer, taking account of the transition between the instances of application by the aerodyne of the flight presets prevailing before the resumption of the automatic following of the flight plan and those newly provided by the flight computer during this same resumption, and validating said constraint in the case where it would not be complied with by the aerodyne if it reached the imposed waypoint by following said forecast of displacement, doing so in order that it remains taken into account in subsequent automatic following of the flight plan.

2. The method as claimed in claim 1, wherein the forecast of displacement of the aerodyne up to the imposed waypoint, taking account of the transition between the instances of application by the aerodyne of the flight presets prevailing before the resumption of the automatic following of the flight plan and those newly provided by the flight computer during the same resumption is made according to a first order variation model.

3. The method as claimed in claim 1, applied to the validation of an altitude constraint, wherein the forecast of displacement of the aerodyne up to the imposed waypoint taking account of the transition between the instances of application by the aerodyne of the flight presets prevailing before the resumption of the automatic following of the flight plan and those newly provided by the flight computer during the same resumption is limited to a vertical trajectory forecast.

4. The method as claimed in claim 3, wherein the vertical trajectory forecast is made by assuming that the aerodyne has, during the vertical speed transition between its initial value $Vz_0$ before the automatic following of the flight plan by the computer (30) and its final value $Vz_f$ imposed by the flight computer, a constant ground speed and a vertical speed Vz according to a first order variation model complying with the relation:

$$Vz = (Vz_0 - Vz_f)e^{-t/\tau} + Vz_f$$

t being the time variable and $\tau$ a constant characteristic of the aerodyne steered by its automatic pilot or its flight director, according to a law of acquisition of a vertical speed preset $Vz_f$.

5. The method as claimed in claim 3, comprising:
   estimating the date $t_{seq}$ of passage of the aerodyne at the constrained waypoint on the basis of the distance $\Delta dist_0$ between the position of the aerodyne upon the instigation of the automatic following of the flight plan and the position of the constrained waypoint by assuming that the aerodyne has a constant ground speed GrdSpd and by applying the relation:

$$t_{seq} = \left| \frac{\Delta dist_0}{GrdSpd} \right|$$

estimating the difference in altitude $\Delta Z_{seq}$ of the aerodyne between the predicted altitude at the constrained waypoint and the value of the altitude constraint, by assuming that the vertical speed of the aerodyne changes, from its initial value $Vz_0$ before the automatic following of the flight plan by the flight computer to its final value $Vz_f$ corresponding to the flight plan and imposed by the computer, by following a first order variation model complying with the relation:

$$\Delta z_{seq} = -\tau(Vz_0 - Vz_f)\left(1 - e^{\left(\frac{-t_{seq}}{\tau}\right)}\right) + Vz_f \cdot t_{seq}$$

$\tau$ being a constant characteristic of the aerodyne steered by its automatic pilot or its flight director, according to a law of acquisition of a vertical speed preset $Vz_f$, and validating the taking into account of the altitude constraint in the case of compliance with the inequality:

$$|\Delta z_{seq}| > |\Delta z_0| - \Delta z_{marg}$$

$\Delta z_{marg}$ being a safety altitude margin.

6. The method as claimed in claim 4, wherein the initial value $V_{z0}$ of the speed of descent of the aerodyne at the moment of the resumption of the automatic following of the flight plan by the flight computer, taken into consideration by the validation system, is measured, at the moment of the instigation of the automatic following of the flight plan, by vertical speed sensors equipping the aerodyne.

7. The method of claim 1, wherein the flight computer is a Flight Management System (FMS) computer.

* * * * *